United States Patent [19]

Fay et al.

[11] Patent Number: 5,110,210
[45] Date of Patent: May 5, 1992

[54] PRECISION ANGLE SENSOR

[75] Inventors: Theodore D. Fay, Mission Viejo; William F. Morgan, Long Beach; Stanley Schneider, Rancho Palos Verdes, all of Calif.

[73] Assignee: McDonnell Douglas Corporation, Long Beach, Calif.

[21] Appl. No.: 557,421

[22] Filed: Jul. 23, 1990

[51] Int. Cl.$^5$ .............................................. G01B 11/00
[52] U.S. Cl. .................................... 356/150; 356/152; 356/373; 364/559
[58] Field of Search ............... 356/138, 150, 152, 372, 356/373, 375; 364/559

[56]  References Cited
U.S. PATENT DOCUMENTS 4,472,054  9/1984  Pouit .................................... 356/152

FOREIGN PATENT DOCUMENTS 2176284  12/1986  United Kingdom ................ 356/373

Primary Examiner—F. L. Evans
Attorney, Agent, or Firm—Gregory A. Cone; John P. Scholl

[57] ABSTRACT

Optical apparatus for measuring angles to a precision approaching the theoretical optical limit for a fixed aperture. Calculations and measurement of the angle are made on the basis of the displacement of a very detailed waveform on a multi-pixel detector from a known point on the detector. The angle this displacement represents is created by the angular displacement of a dispersive element attached to the object of interest. The beamline comprises an optical source, the dispersive element on the object, and a spectrometer which contains an echelle and the detector. The known point on the detector is established by aligning the beamline to a fiducial angle.

11 Claims, 3 Drawing Sheets $$\alpha - (+\beta) = 2\theta$$
$$\gamma = \alpha + \beta$$

PRECISION ANGLE SENSOR

BACKGROUND OF THE INVENTION

This invention relates to the precision measurement of angles by optical means. More particularly it relates to apparatus which utilizes an echelle or blazed grating in a spectrometer interacting with the optical output from a dispersive element on the object of interest to achieve great sensitivity of movement of the resulting patterns on a detector.

The ability to measure angles to submicroradian accuracy is necessary for a variety of advanced applications. Increased accuracy in the alignment of existing instruments will allow for increased accuracy in their measurements and actions. Ion beam mapping of microstructures could be made much more detailed. Ion beam etching of microelectronic arrays could produce smaller and faster devices. The need in space technologies is particularly acute. Long range space communications require very accurate alignment of antennae. The same is true if long range beam power transmission is to be feasible, e.g. microwave, laser or particle beam. This level of accuracy is also needed for specialized scientific missions such as gravitational wave detection and precision astronomy.

At present the state of the art is represented by the autocollimator. It is capable of just microradian accuracy, and the physics of the device restrict it past a certain level. What is needed is a low cost, compact device that can achieve even better accuracy in measuring angles than the autocollimator.

SUMMARY OF THE INVENTION

The precision angle sensor of this invention comprises a light source, a dispersive means on the object of interest that interacts with the light from the source, and a spectrometer means comprising an echelle and a solid state detector. The dispersive element can be a diffraction grating, a prism or combination grating-prism, any one of which operates to fan out the light beam into its higher orders. The dispersed beam is then conducted to the spectrometer which further disperses the beam with its own echelle. The spectrometer can also include a further element, a Fabry-Perot interferometer, which will act to add further detail to the optical pattern finally sensed on the solid state detector in the spectrometer.

The actual calculation of the angle is correlated to the movement of the optical pattern on the detector by a computer-implemented process of image recognition. The actual sensed image comprises a digitally mapped output from the pixel grid of the detector. This actual image map is compared in the computer to a model also generated by the computer of an image which would be produced by the optical system for a given angle. A least squares fit is made between the actual image and the model. If the deviation is within acceptable limits, the model angle is adopted as the value of the actual angle. If not, the model parameters are adjusted by the computer until an acceptable correlation is achieved.

The highest accuracies are obtained by working the gratings in their higher orders in conjunction with the Fabry-Perot interferometer and a Ronchi ruling as the slit. This will produce a sinc function waveform from the Ronchi ruling modulated vertically by ringlets from the Fabry-Perot interferometer. This amount of detail in the images will allow for very precise correlations to be made between the actual and model images. The high orders in the gratings are extremely sensitive to the angular displacement of the grating on the object of interest although the field of view of the system is correspondingly diminished. By working in lower orders a wider field of view can be achieved at the expense of angular precision. In the narrow field of view embodiments it may be necessary to reset the system by turning the dispersive element or other elements in the system by precision means such as a microstepper motor or a piezoelectric element. The computer would then update any model to account for this change in angular position of the dispersive element from its earlier known position relative to the object of interest.

The invention may be better understood by reference to following drawings, detailed description of the invention, and the appended claims.

DETAILED DESCRIPTION OF THE INVENTION

The precision angle sensing system of this invention is adaptable to a wide range of precisions and dynamic ranges. Certain components will be substituted for others depending upon the application. What follows is a discussion of a very high precision inplementation capable of accuracy in the range of one nanoradian.

Figure 1:
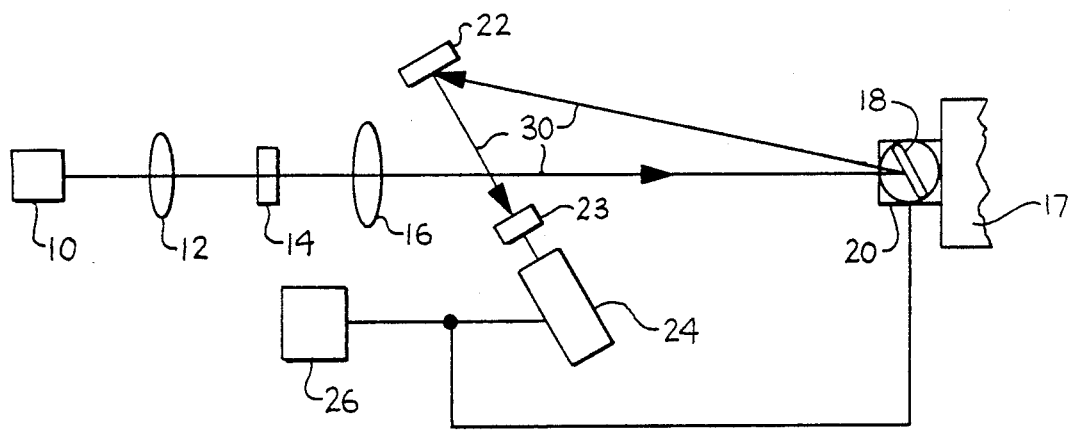
FIG. 1 is a schematic view of the elements of the system with the dispersive element located on a cooperative object which has precision turning means for the dispersive element.

FIG. 1 shows in diagramatic view the components of this embodiment. Block 10 represents a tungsten filament halogen light source. Feature 12 is a condensing lens, feature 14 is a slit, and feature 16 is a collimating lens. These four elements 10, 12, 14, and 16 can be considered together as the light (photon) source for the system. The component can be generalized to other types of apparatus which could produce visiable light such as light emitting diode arrays or lasers and also other arrangements which could produce electromagnetic radiation (photons) from other regions of the E-M spectrum. The collimated light then leaves the light source and interacts with the blazed grating 18 mounted upon the rotatable stage 20 which in turn mounted to the object of interest 17. The particular grating used had 300 lines/mm with a blaze angle of 5 degrees and was manufactured by Bausch and Lomb (now Milton Roy Corp.). This is the dispersive element on the cooperative object. This element could also be replaced with a prism, other types of diffraction gratings and the like for use at visible and ultraviolet wavelengths. If X-rays were used as the photons, the dispersive element would typically be a crystal of known crystallographic structure which would act to disperse the X-ray photons.

Element 22 is an off axis parabloid mirror which reflects the light beam 30 to the optional element 23 which is the optional Fabry-Perot interferometer and from there into the precision spectrometer unit 24. The system is controlled by control means 26 which sends commands to rotate the precision stage 20 and also accepts the wavelength measurement output from the spectrometer 24. It also is able to provide calculated models statistically fit in a least squares sense against the wavelength measurements from the spectrometer 24 to arrive at a final calculated value for the angular deviation of the object of interest relative to a system fiducial. This system fiducial here would be the beam of light represented as a straight ray originating at the tungsten light source and ending at the intersection of this light beam with a dispersive element 18. Angular motion of the object of interest 17 would then cause slight angular deviation of the dispersive element 18 which in turn would cause deviation in an angular sense of the dispersed light beam between element 18 and element 22 and so forth. If the grating 18 and the grating 34 in the spectrometer 24 are worked at sufficiently high orders in conjunction with the optional Fabry-Perot interferometer 23, the systems capable of angular measurements approaching 1 nanoradian in accuracy.

Figure 2:
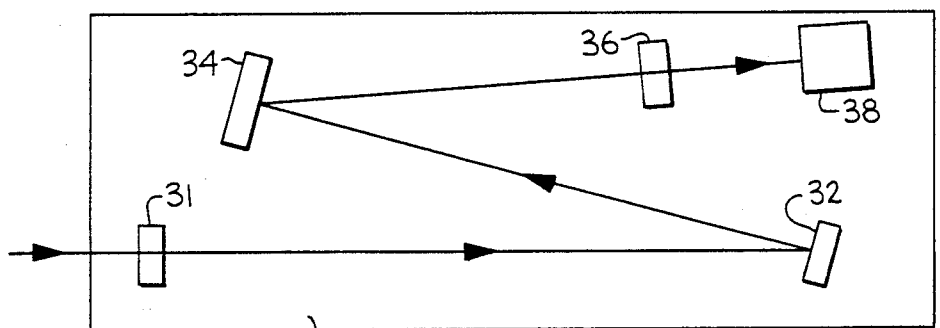
FIG. 2 is a schematic view of the spectrometer.

FIG. 2 is a diagramatic view of the elements within the precision spectrometer 24 shown in FIG. 1. The light beam 30 enters into the spectrometer 24 through a slit means 31. For simpler implementations this would be a single slit. However, when high photon throughput is desired as well as increased accuracy, a multiple slit element such as a Ronchi ruling can be used here. The photons then continue through the spectrometer to the collimator mirror 32 which reflects the light onto the spectrometer dispersive element 34. Normally this element will again be a blazed grating or echelle. The particular echelle grating used had 31.6 lines/mm with a blaze angle of 63 degrees. It was made by Milton Roy Corp., 820 Linden Ave., Rochester, N.Y. 14625. From here the dispersed light pattern passes through a camera lens 36 onto a solid state detector 38. This detector is preferably a charge coupled device or a charge injection device which has a high multiplicity of pixels on its face. The photons will fall onto the face of the detector 38 in a definite pattern which is then mapped onto the grid of the pixels on the detector. The action of the two echelles 18 and 34 produces a sinc-like function. When this function is combined with the optional Fabry-Perot interferometer 23, additional vertical ringlets are added to the already complex sinc pattern to produce a highly detailed pattern upon the detector. The control means 26 shown in FIG. 1 will calculate a model for a particular angular orientation of the object of interest 17 which would produce a pattern very similar to that sensed by the detector. If the statistical match between the model pattern and the patten sensed on the detector 38 is close enough in a least squares sense, the angular information about the object of interest 17 which was used by the control means to produce the model pattern will be adopted as the accurate measurement of the angular attitude of the object of interest. The precision stage 20 in FIG. 1 is equipped with precision angular motion means which would normally be either a microstepper motor or some type of piezoelectric element. Actuation this element will rotate the echelle 18 very slightly. This is used to perform initial calibration of the precision angle sensor and can also be used to "reset" the sensed patterns on the detector is the patterns begin to move out of the angular field of view of the detector as well as to provide very fine adjustments during the measurement process.

Figure 3:
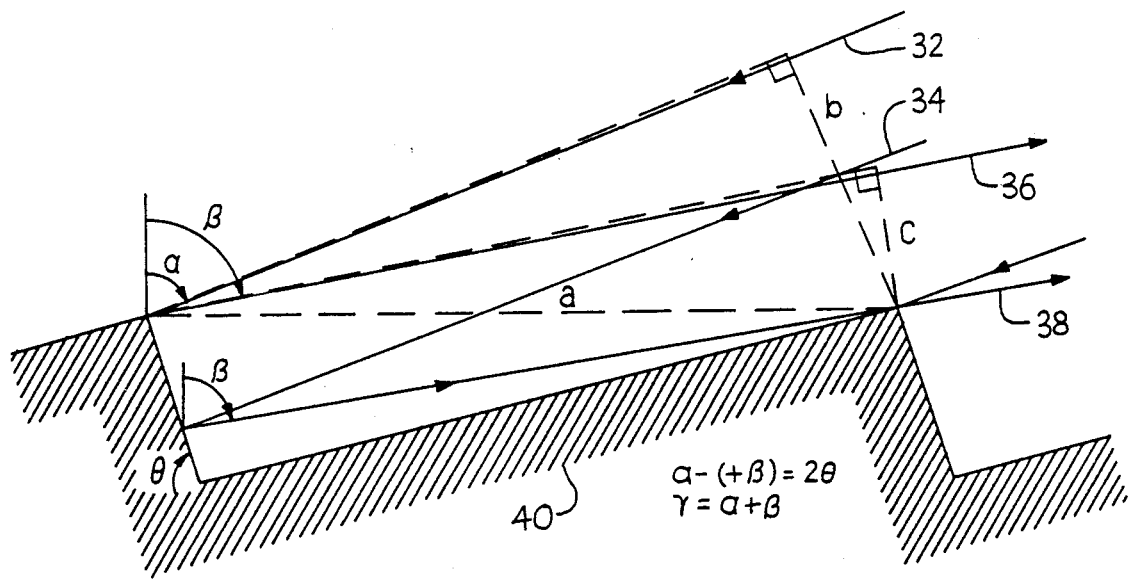
FIG. 3 is a diagram showing the interaction of a grating with light rays.

The operation of the echelle 34 within the precision spectrometer 24 can be further explained by reference to FIG. 3. The blaze angle, $\theta$, of the echelle will be about 60–65 degrees, and its angular dispersion is such that its free spectral range is given by $\delta\lambda = \lambda/m$ or about a 30 Å spread for a few degrees of detector acceptance angle for $\lambda = 1200$ Å and m equal to the 40th order.

The angular dispersion of the grating is given by $$d\delta/d\lambda = (\sin\delta - \sin\alpha)/(\lambda\cos\alpha)$$

where
 $\alpha$ = incidence angle
 $\delta$ = diffraction angle
 $d\lambda$ = required wavelength resolution The angular dispersion is related to the linear dispersion on the camera focal plane by $$\frac{dX}{d\lambda} = \frac{d\delta}{d\lambda} \cdot F$$

where F is the focal length of the camera optics. When the echelle is operated near autocollimation the blaze angle, $\theta$, is about equal to $\alpha$ or $-\beta$. An angular accuracy of 20 mrad required that one resolve about 0.001 Å at 1215 Å so that $$F = \frac{d\lambda}{\lambda} \frac{dx}{2\tan\theta} \approx 50 \text{ cm}$$

if $\lambda/d\lambda \sim 10^5$, $dx = 2 \times 10^{-3}$ cm and $\theta = 63$ deg.

The echelle must be designed, coated, and mounted so that the efficiency is as high as practical. The three contributions to the efficiency of the echelle are the reflective efficiency, $E_R$, the geometric efficiency, $E_G$ and the $\sin\theta/\theta$ (or sinc) ripple efficiency, $E_S$.

Since $E = E_R \cdot E_G \cdot E_S$, the object is maximize each factor. $E_R$ is the reflectivity, R, which will be about 0.9 for $\lambda \geq 2000$ Å and about 0.8 for $\lambda < 1200$ Å. $E_S$ is defined below $$E_s = \text{sinc}^2\left(\frac{m\pi \cos\alpha \sin(\gamma - \theta)}{\sin\gamma}\right)$$

where $\gamma$ = scan angle and $\theta$ = blaze angle. $E_G$ will approach 1 if $\theta = \alpha = -\beta$ where $\alpha$ = angle of incidence and $\beta$ = diffraction angle since b = a sin $(\pi/2 - \alpha)$ = a cos$\alpha$ c = a sin $(\pi/2 - \beta)$ = a cos$\beta$ $E_G$ = c/b = cos$\beta$/cos$\alpha$ FIG. 3 shows these interactions with incident rays 32 and 34 being diffracted as rays 36 and 38 from the echelle 40. The sinc ripple efficiency increases with the order, m, which also increased with blaze angle and wavelength. Thus the order is chosen to give a convenient sinc$^2$ ripple function.

The mathematical models used to simulate the shifting Ronchi patterns that map the sinc$^2$ ripple function onto the face of the spectrometer camera are taken from the classical theory of diffraction. This general theory may be found in many standard optics texts, e.g. "Principles of Optics," 1980, M. Born and E. Wolf, Pergamon Press. This general theory must be adapted to precisely describe the pattern produced by visible light being both reflected and diffracted from a series of three ruled surfaces. These surfaces in our case are the cooperative object grating, the Ronchi ruling and the echelle grating. The angle associated with a specifc pattern on the face of the camera must be found as quickly and precisely as possible.

This problem was found to have no mathematical solution in closed form. The light intensity pattern on the face of the camra may be represented however by a single fourier series in the Ronchi pattern phase angle shift. The higher terms of this series have been omitted to increase the speed of the data processing and hence the update speed in finding the phase angle. The algorithm associated with this phase angle is given below, and the Fortran code listed at the end of this section is based on the algorithm. This Fortran code conducts a conjugate gradient search to find the phase angle, $A_2$, that gives the best match (in the least squares form) between the model algorithm and the data output from the spectrograph camera. Update times as fast as 1/30 sec. have been demonstrated in the laboratory.

$$\text{Damping} = e^{-(\frac{X-A4}{A5})^2}$$

$$W_H = A_3(1 + A_{10} \cdot X)$$
$$U_L = A_6 \cdot X + A_8$$

$$\text{Intensity} = A_1 \cdot \text{Damping} \cdot \cos(W_H \cdot X + A_2) + A_7 \cdot \frac{\sin(U_L)}{U_L} + A_9$$

Figure 4:
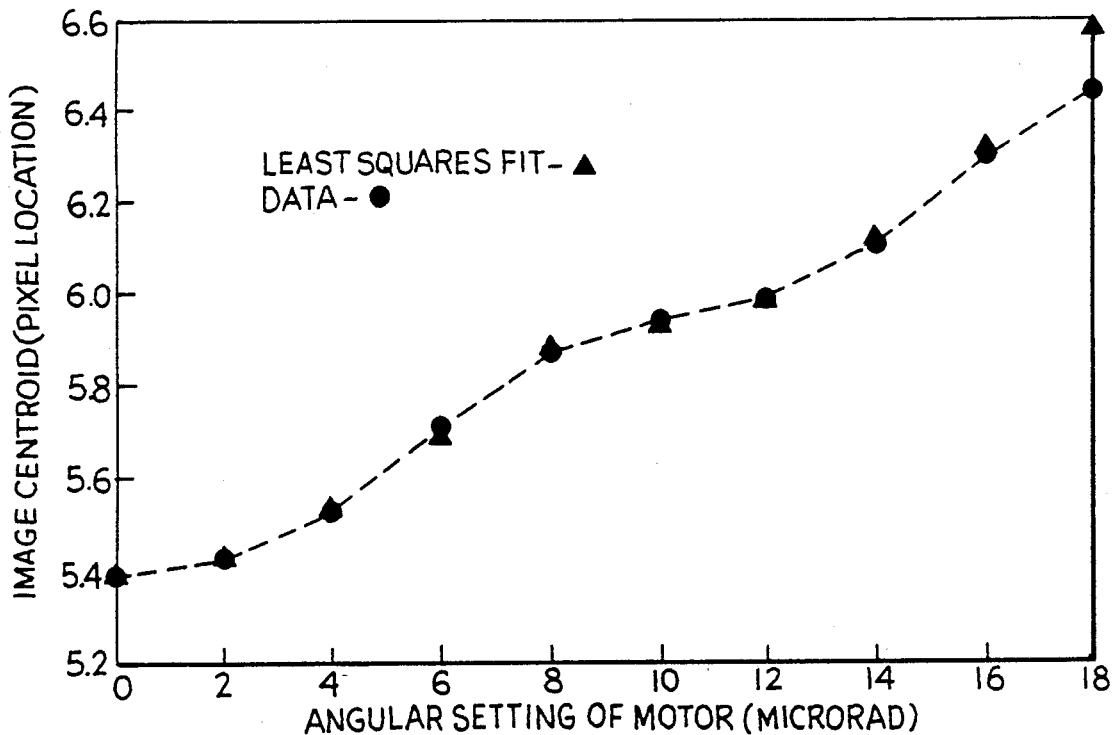
FIG. 4 is a graph showing the linearity of angular response of the system when a microstepper motor is used.
Figure 5:
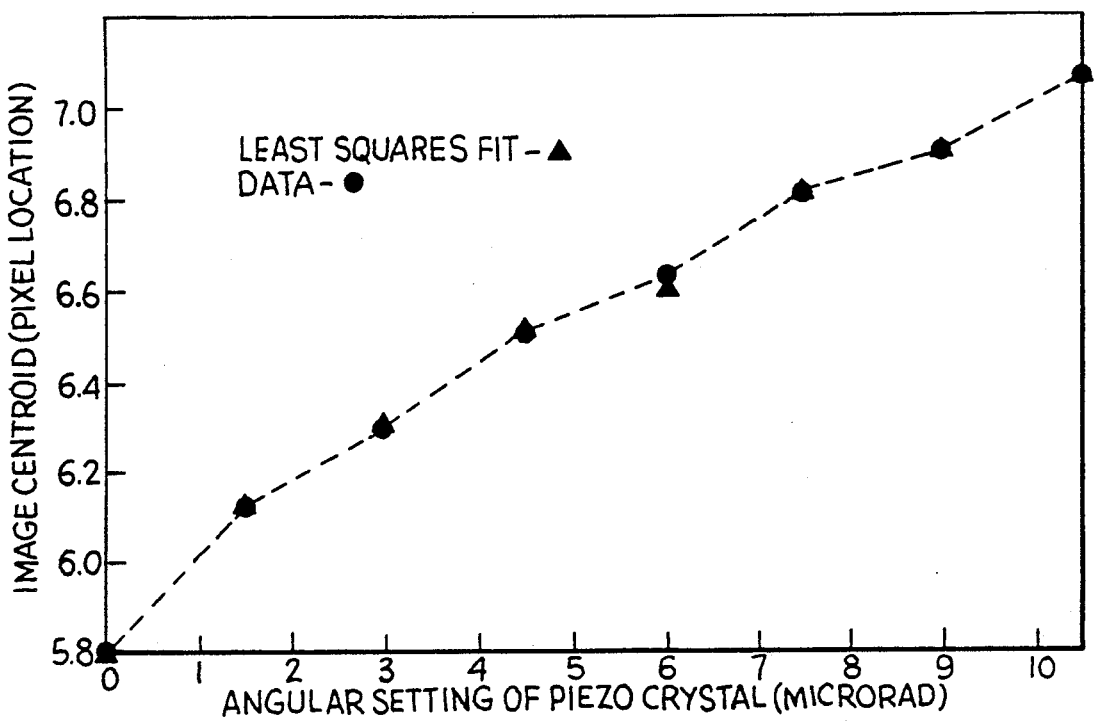
FIG. 5 is a graph showing the linearity of angular response of the system when a piezoelectric element is used; and, FIG. 6 is a graph showing the accuracy of the system at different angles.

A1 = Ronchi-wave Amplitude
A2 = Ronchi-wave Phase Angle
A3 = Ronchi-wave Basic Frequency
A4 = Ronchi-wave Symmetry Point
A5 = Ronchi-wave Damping Length
A6 = Grating-wave Frequency
A7 = Grating-wave Amplitude
A8 = Grating-wave Phase
A9 = Background Intensity Parameter
A10 = Change-rate of Ronchi-wave Frequency The spectrometer may be operated in two modes: single slit and Ronchi ruling. FIGS. 4 and 5 illustrate the linearity of response between camera pixel location and the setting of the precision angular motion means. These graphs were produced by operation of the spectrometer in a single slit mode. The light level from the tungsten lamp source was elevated until the CID camera recorded over $10^5$ counts from the source for each averaged frame. These results show that the single slit embodiment achieves an angular sensing precision at high light levels of the order of 100 nanoradians depending upon the actuator. The piezoelectric transducer shown in FIG. 5 shows a smoother trend in optical image motion on the camera face versus angular setting than does the microstepper motor data shown in FIG. 4.

Figure 6:
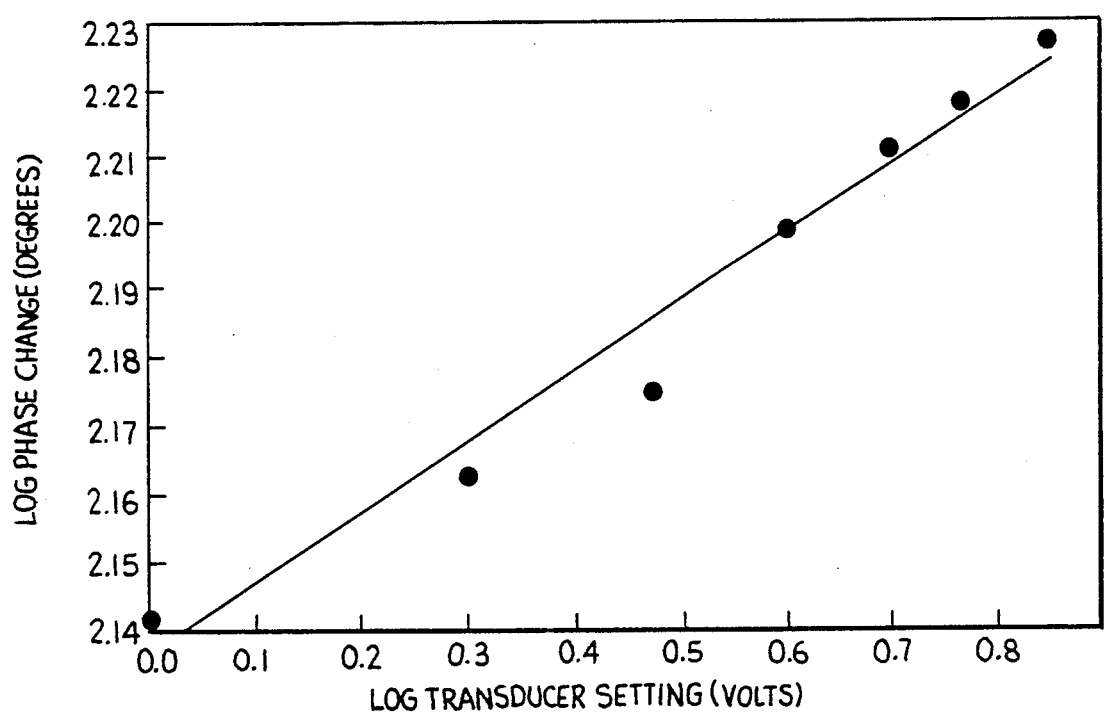

When the single slit is replaced with a multiple slit Ronchi ruling that has five line pairs per millimeter, a pattern of up to 36 slit images per 512 pixels is produced. The line spacing on the Ronchi runling can be from 20 lines/mm to 5 lines/mm. The rulings employed herein were manufactured by Virgo Optics, Applied Image Inc., 1653 East Main St., Rochester, N.Y. 14609. These rulings were made of transparent material (glass) to which a precision pattern of parallel opaque bars and transparent openings is applied. These images are shifted by approximately the same large linear value as small changes are made by the actuator on the dispersive means 17. The calibration between the Ronchi ruling phase angle and the actuator setting angle is determined by the least squares algorithm and is about 3.6 degrees (61 milliradians) of phase angle shift per 30 nanoradians change in angle of the cooperative target. This is shown in FIG. 6. This represents a gain of $2 \times 10^6$ in the angular sensing system. Thus, the Ronchi pattern moves one percent of the distance between two bright fringes (3.6 degrees) with a 0.1 volt change on the piezoelectric transducer (30 nanoradians of cooperative target angle shift). Initially better accuracies had been expected when the Ronchi ruling was introduced. It was expected to be able to easily measure phase shifts of at least two degrees in Ronchi phase angle corresponding to an angular accuracy of about 16 nanoradians, since the expected angular accuracy increase should be equal to the square root of the number of Ronchi slits (36) (or about 100 microradians/6).

Occasionally such excellent accuracy was achieved as shown by the top four points in FIG. 6. Moreoften, however, errors of up to 30 nanoradians or more were observed as shown on the bottom part of FIG. 6. Such shifts also occurred even when the piezoelectric actuator was not moved. These shifts turned out to be correlated to environmental changes in the system such as changes in the pressure and index of refraction of the air as well as changes in the grating temperature. The majority of the observed shift in the Ronchi pattern wavelengths is due to the expansion of the grating grooves and is consistent with the manufacturer's specification for the thermal expansion of the boro silicate glass used in the grating and thermal changes in the laboratory. Once improvements are made to the system to compensate for these environmental effects, the accuracy should increase to its theoretical maximum of about 16 nanoradians.

The precision angle sensor has achieved a level of accuracy that is superior to autocollimators of the same size. This is because autocollimators are line of sight devices that do not exploit the principle of diffraction to improve angular sensing accuracy. The precision angle sensor uses an echelle grating operated in a high order as the active diffraction component. The gain in angular sensing accuracy from the precision angle sensor of a fixed optical aperture is proportional to the order in which the echelle is worked and inversely proportional to the tangent of its blaze angle. The highest expected gain from the grating 18 and the 63 degree echelle grating in the spectrometer worked in the 120th order (near 5400 Å) is about 25 relative to an autocollimator of similar size. Since autocollimators of similar size (5 centimeter diameter) are limited to 250 microradians by diffraction, the accuracy of the precision angle sensor should be about 10 nanoradians as has been nearly demonstrated experimentally. Furthermore, the principle limiting the accuracy of autocollimators of a given aperture (diffraction of light) is used to achieve the sensitivity gain.

The choice of a dual grating system for this embodiment is a design compromise between the higher accuracy of a Fabry-Perot interferometer (about 1 nanoradian) and the lower accuracy of a prism or grating-prism angle sensing system (less than 100 microradians). In general, the higher the order of that a chosen optical design is worked, the higher the potential sensing accuracy for a given application. The more sensitive the optics design, however, the more susceptible they are to environmental changes as we have demonstrated in the laboratory, thus largely negating design performance improvements in actual practice.

If the system is environmentally stabilized, the accuracy can be increased with the addition of the optional Fabry-Perot interferometer element 23. The particular element used herein was a 2 mm separation Fabry-Perot interferometer from Virgo Optics, 302 Commerce Ave., Port Richie, Fla. 33568. As noted before, the Fabry-Perot element adds further detail to the Ronchi ruling pattern by imposing vertically oriented ringlets on the Ronchi $sinc^2$ function sensed on the detector. This "finer grain" allows an even more precise statistical correlation to be made between the modelled angle and the sensed pattern on the detector pixels. Accuracies at this level, 1 nanoradian, begin to approach the theoretical maximum precision at this wavelength, while maintaining the comparably "coarser" sensing capability of this Ronchi pattern.

The system is intended to be used in its linear range with rather small fields of view so that the response of the system is in the linear range of the sine function of less than about 5 degrees. However if the control means is modified to be able to work in the non-linear ranges for wider fields of view, the system can be used for these applications as well.

What is claimed is:

1. A precision angle sensor system to measure angular deflection of an object relative to a system fiducial comprising:

photon source means;

photon dispersion means mounted on the object;

spectrometer means comprising spectrometer slit means, spectrometer dispersion means and a multipixel detector to sense patterns of photons falling thereupon; and system control means to calculate the angular deflection of the object based upon a comparison of the shift in position of a known pattern of photons on the detector from a first position produced by a known orientation of the object to a second position produced by the deflection of the object, the comparison being made between said second position of the known pattern and a plurality of positions of simulations of the known pattern produced by model generation means for a plurality of different simulated known deflections of the object, said system control means being connected to the output of the multiplexed detector.

2. The system of claim 1 further comprising precision angular motion means to change the angular orientation of the photon dispersion means in response to commands from the system control means in order to keep the known pattern within the field of view of the spectrometer means.

3. The system of claim 2 wherein the photon source is a broad spectrum incoherent light source.

4. The system of claim 3 further comprising a condensing lens means, a slit means and a collimating lens means in order between the light source and the photon dispersion means.

5. The system of claim 1 wherein the spectrometer slit means is a Ronchi ruling.

6. The system of claim 4 wherein the photon dispersion means and the spectrometer dispersion means are blazed gratings.

7. The system of claim 6 further comprising Fabry-Perot interferometer means located between the photon dispersion means and the detector.

8. The system of claim 6 wherein the system control means further comprise means to send commands to the precision angular motion means to change its angular orientation relative to the fiducial.

9. The system of claim 1 wherein the photon source is a coherent light source means.

10. A precision angle sensor system to measure angular deflection of an object relative to a system fiducial comprising:

an incoherent light source means having condensing lens means, a slit means and a collimating lens means;

a blazed grating mounted on the object;

spectrometer means comprising a Ronchi ruling means, spectrometer blazed grating means and a multipixel detector to capture the light leaving the blazed grating on the object and measure the angular deflection of the object as a function of the displacement of the patterns of the captured light sensed by the detector relative to the system fiducial;

a Fabry-Perot interferometer means located between the blazed grating on the object and the detector; and system control means to compute the angular orientation of the object relative to the fiducial by a comparison between a model pattern generated by the system control means based upon an assumed angular orientation of the object and the actual pattern of the captured light.

11. The system of claim 10 further comprising precision angular motion means to change the angular orientation of the blazed grating on the object responsive to commands from the system control means.

* * * * *